US012501232B1

(12) United States Patent
Chang et al.

(10) Patent No.: US 12,501,232 B1
(45) Date of Patent: Dec. 16, 2025

(54) GEOVALIDATION FOR NON-EMERGENCY CALLS

(71) Applicant: Needl, Inc, Seattle, WA (US)

(72) Inventors: Kyu-Hyun Chang, Seattle, WA (US); James Liu, Seattle, WA (US)

(73) Assignee: Needl, Inc, Seattle, WA (US)

(*) Notice: Subject to any disclaimer, the term of this patent is extended or adjusted under 35 U.S.C. 154(b) by 0 days.

(21) Appl. No.: 19/258,318

(22) Filed: Jul. 2, 2025

(51) Int. Cl.
  *H04W 4/021* (2018.01)
  *G06F 16/21* (2019.01)
  *G06F 16/29* (2019.01)

(52) U.S. Cl.
  CPC ......... *H04W 4/021* (2013.01); *G06F 16/212* (2019.01); *G06F 16/29* (2019.01)

(58) Field of Classification Search
  CPC ........................... H04W 84/005; H04W 84/06
  See application file for complete search history.

(56) References Cited

U.S. PATENT DOCUMENTS

| | | |
|---|---|---|
| 10,582,343 B1 | 3/2020 | Patton et al. |
| 11,625,152 B1 | 4/2023 | Johnston et al. |
| 12,124,823 B2 | 10/2024 | Mishchenko et al. |
| 12,284,189 B1 | 4/2025 | Schwartz et al. |
| 12,288,459 B1 | 4/2025 | Lewy et al. |
| 2015/0097670 A1* | 4/2015 | Chitre ............... H04W 4/02 340/539.13 |
| 2021/0383918 A1* | 12/2021 | Martin ............... G06F 16/909 |

* cited by examiner

*Primary Examiner* — Kwasi Karikari
(74) *Attorney, Agent, or Firm* — NEO IP

(57) ABSTRACT

Systems and methods directed to validating an address extracted from a telephone conversation. An artificial intelligence (AI) engine is operable to utilize natural language processing and large language model (LLM) capabilities to generate and analyze a transcript of the telephone conversation in real-time. The AI engine is operable to extract an address from the telephone conversation, populate a custom data schema, request more information, and compare the extracted address to a database of addresses to ensure the accuracy of the extracted address.

17 Claims, 7 Drawing Sheets

GEOVALIDATION FOR NON-EMERGENCY CALLS

BACKGROUND OF THE INVENTION

1. Field of the Invention

The present invention relates to validating a location of a device (i.e., geovalidation). More specifically, the present invention relates to an improvement to artificial intelligence address validation capabilities during a non-emergency telephone call.

2. Description of the Prior Art

It is generally known in the prior art to locate a device using metadata.

Prior art patent documents include the following:

U.S. Pat. No. 12,288,459 for systems and methods of providing emergency notifications to operations centers using radio-based dispatches by inventors Leah Lewy et al., filed Dec. 31, 2024, and issued on Apr. 29, 2025, is directed to an emergency response data system (ERDS) provides artificial intelligence (AI)-based emergency notifications to operations centers using radio-based dispatches from emergency communications center (ECC). The ERDS receives audio data of a radio-based dispatch of first responders to a location of an initiated emergency communication. The ERDS provides the audio data to an AI model with a prompt to transcribe the audio data into a radio dispatch transcript. The ERDS provides the radio dispatch transcript to the AI model with a prompt to analyze the radio dispatch transcript to extract a location of the initiated emergency communication from the radio dispatch transcript. The ERDS provides an AI-based emergency notification to an emergency response application that is operable to display the AI-based emergency notification on an operations center computing system. The AI-based emergency notification includes the location of the initiated emergency communication.

U.S. Pat. No. 10,582,343 for validating and supplementing emergency call information by inventors Damien Patton et al., filed on Jul. 29, 2019, and issued on Mar. 3, 2020, is directed to methods, systems, and computer program products for validating and supplementing emergency call information. A Public Safety Answering Point receives an emergency (e.g., 911) call from a mobile device. Parts of the emergency call are processed to identify an emergency call location. Characteristics of the emergency call are combined with characteristics of other signals to identify and emergency call event, including the emergency call location. The emergency call event is sent to the Public Safety Answering Point. Prior to receiving phase II data and possibly even prior to receiving phase I data, the Public Safety Answering Point receives the event. The Public Safety Answering Point tailors dispatch of emergency resources responding to the emergency call based on characteristics of the event, including the originating location.

U.S. Pat. No. 12,124,823 for schema-based integration of external APIs with natural language applications by inventors Andrey Mischenko et al., filed Sep. 25, 2023, and issued on Oct. 22, 2024, is directed to methods, systems, and computer-readable media for integrating a particular external application programming interface (API) with a natural language model user interface. In one embodiment, a method includes receiving a first input at the natural language model user interface, determining the first input includes a request to integrate the particular external application programming interface (API) with the natural language model user interface, identifying the particular external API based on the received input, integrating the particular external API with the natural language model user interface, accessing the particular external API based on the first input or a second input at the natural language model user interface, and transmitting, based on the accessing, a response message to the natural language model user interface, the response message including a result of the accessing.

U.S. Pat. No. 11,625,152 for automated workflow selection for agent within an electronic conversation system by inventors Michael Johnston et al., filed Oct. 29, 2021, and issued Apr. 11, 2023, is directed to an environment in which users converse at least partly with human agents to accomplish a desired task, a server assists the agents by identifying workflows that are most applicable to the current conversation. Workflow selection functionality identifies one or more candidate workflows based on techniques such as user intent inference, conversation state tracking, or search, according to various embodiments. The identified candidate workflows are either automatically selected on behalf of the agent, or are presented to the agent for manual selection.

U.S. Pat. No. 12,284,189 for location verification system and method of verifying a location of an entity by inventors Abraham Schwartz et al., filed Jan. 16, 2024, and issued on Apr. 22, 2025, is directed to a location verification system and method of verifying a location of an entity. The method includes receiving, using at least a processor, user data related to an entity, wherein the user data includes location data, generating, using the at least a processor, a user profile as a function of the user data, verifying, using the at least a processor, the location data of the user profile, receiving, using the at least a processor, a unique identifier of at least a location identifying component, wherein the unique identifier is associated with the location data of the user profile and verifying, using the at least a processor, a location of the entity by comparing geolocation data of a user device and the location data associated with the unique identifier.

SUMMARY OF THE INVENTION

The present invention relates to location validation of at least one caller.

It is an object of this invention to provide systems and methods to extract and validate a location from a telephone call. More specifically, it is an object of this invention to improve artificial intelligence address validation capabilities during a non-emergency telephone call.

In one embodiment, the present invention is directed to a system for location validation, including a platform including a processor, a memory, and an artificial intelligence (AI) engine, wherein the platform receives a telephone call from a user device, wherein the AI engine is operable to extract an address from the telephone call via natural language processing and large language model capabilities, wherein the AI engine is operable to populate a custom data schema based on the extracted address, wherein the AI engine is operable to compare the populated custom data schema against at least one database, wherein the AI engine is operable to generate targeted address corrections based in part on discrepancies in the comparison between the populated custom data schema and the at least one database, and wherein the AI engine is operable to validate the extracted address when similarity of the comparison between the populated custom data schema and the at least one database exceeds a predefined threshold.

In another embodiment, the present invention is directed to a method for location validation, including providing a platform including a computer processor, a memory, and an artificial intelligence (AI) engine, receiving a telephone call from a user device by the platform, extracting an address by the AI engine from the telephone call via natural language processing and large language model capabilities, utilizing machine learning (ML) by the AI engine to populate a custom data schema based on the extracted address, comparing by the AI engine the populated custom data schema against at least one database, generating targeted address corrections by the AI engine based in part on the comparison between the populated custom data schema and the at least one database, and validating by the AI engine the extracted address when the comparison between the populated custom data schema and the at least one database exceeds a predefined threshold.

In yet another embodiment, the present invention is directed to a system for location validation, including a platform including a processor, a memory, and an artificial intelligence (AI) engine, wherein the platform receives a telephone call from a user device, wherein the AI engine is operable to extract an address from the telephone call via natural language processing and large language model capabilities, wherein the AI engine is operable to utilize machine learning (ML) to populate a custom data schema based on the extracted address, wherein the AI engine is operable to compare the populated custom data schema against at least one database, wherein the AI engine is operable to generate targeted address corrections based in part on the comparison between the populated custom data schema and the at least one database, wherein the AI engine is operable to validate the extracted address when the comparison between the populated custom data schema and the at least one database exceeds a predefined threshold, and wherein the AI engine is operable to provide a confidence level that the validated extracted address is accurate.

These and other aspects of the present invention will become apparent to those skilled in the art after a reading of the following description of the preferred embodiment when considered with the drawings, as they support the claimed invention.

DETAILED DESCRIPTION

Figure 1A:
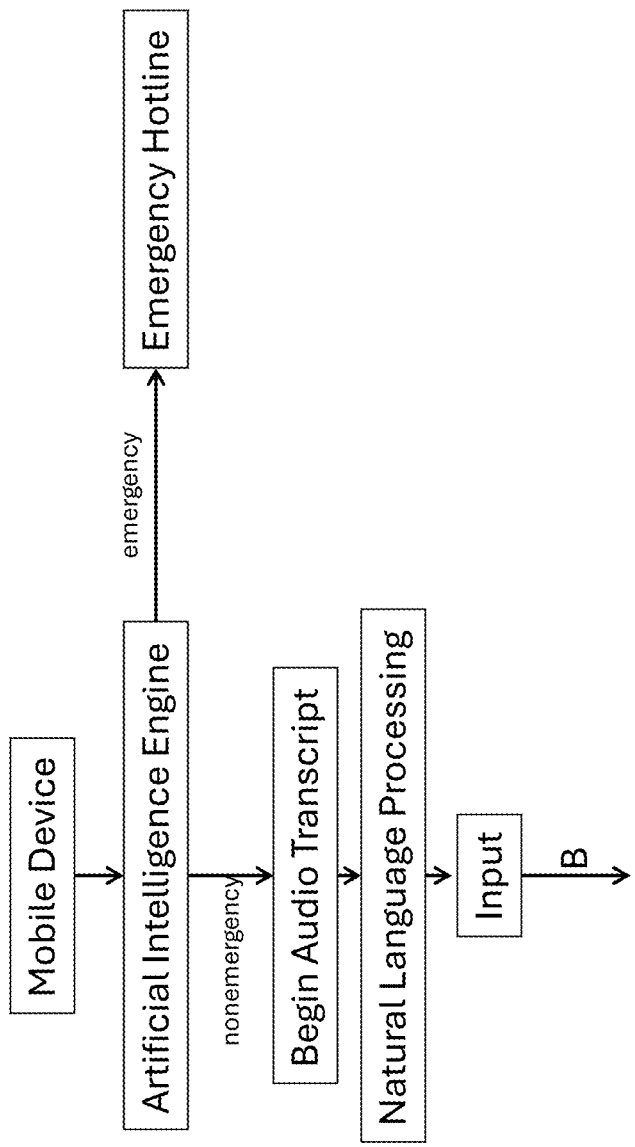
FIG. 1A is a schematic diagram of a platform including an artificial intelligence engine screening a call according to one embodiment of the present invention.

The present invention is generally directed to validating a location of a device (i.e., geovalidation).

In one embodiment, the present invention is directed to a system for location validation, including a platform including a processor, a memory, and an artificial intelligence (AI) engine, wherein the platform receives a telephone call from a user device, wherein the AI engine is operable to extract an address from the telephone call via natural language processing and large language model capabilities, wherein the AI engine is operable to populate a custom data schema based on the extracted address, wherein the AI engine is operable to compare the populated custom data schema against at least one database, wherein the AI engine is operable to generate targeted address corrections based in part on discrepancies in the comparison between the populated custom data schema and the at least one database, and wherein the AI engine is operable to validate the extracted address when similarity of the comparison between the populated custom data schema and the at least one database exceeds a predefined threshold.

In another embodiment, the present invention is directed to a method for location validation, including providing a platform including a computer processor, a memory, and an artificial intelligence (AI) engine, receiving a telephone call from a user device by the platform, extracting an address by the AI engine from the telephone call via natural language processing and large language model capabilities, utilizing machine learning (ML) by the AI engine to populate a custom data schema based on the extracted address, comparing by the AI engine the populated custom data schema against at least one database, generating targeted address corrections by the AI engine based in part on the comparison between the populated custom data schema and the at least one database, and validating by the AI engine the extracted address when the comparison between the populated custom data schema and the at least one database exceeds a predefined threshold.

In yet another embodiment, the present invention is directed to a system for location validation, including a platform including a processor, a memory, and an artificial intelligence (AI) engine, wherein the platform receives a telephone call from a user device, wherein the AI engine is operable to extract an address from the telephone call via natural language processing and large language model capabilities, wherein the AI engine is operable to utilize machine learning (ML) to populate a custom data schema based on the extracted address, wherein the AI engine is operable to compare the populated custom data schema against at least one database, wherein the AI engine is operable to generate targeted address corrections based in part on the comparison between the populated custom data schema and the at least one database, wherein the AI engine is operable to validate the extracted address when the comparison between the populated custom data schema and the at least one database exceeds a predefined threshold, and wherein the AI engine is operable to provide a confidence level that the validated extracted address is accurate.

None of the prior art discloses an artificial intelligence engine operable to filter out nonemergency calls, extract a location from a conversation, ask follow-up questions, and validate the extracted location.

In the United States, emergency hotline operators (i.e., 9-1-1 operators) receive millions of calls annually. However, many of the calls received by the emergency hotline are not true emergencies. Often, people call the emergency hotline to complain about noise violations, parking violations, road damage, etc. Problematically, operators are unable to determine whether a call is an emergency or not before answering the call and conversing with the caller. So, operators answer every call, emergency or not, which overworks the operators, depletes human resources, and slows emergency response time. Therefore, there exists an unmet need for a system that automatically filters non-emergency calls before the operator speaks with the caller.

Regardless of whether the call is an emergency, the location of the caller is still important. Generally, because the emergency hotline is designed to assist in dispatching emergency services to the location of the caller (i.e., ambulance, police, firefighters, etc.), the United States government has mandated location tracking of devices making emergency calls. The location of the calling device is included in the metadata to assist call operators so that the operators do not need to ask or verify the location of the device. However, non-emergency calls do not include the same metadata, making it difficult to determine the location of the caller. As such, for non-emergency calls, a non-emergency call operator or a computer system must listen to a caller and determine the location of the caller. Although not automatically determined, the location of a caller for a non-emergency call is still important. For example, for authorities to respond to a noise violation, the operator must know the location of the caller. Prior art methods rely on user accuracy without validating the address exists and/or is accurate. For example, a user may believe they are at 1234 Main Street. However, 1234 Main Street may not exist. In this example, the actual address is 1432 Main Street. For non-emergency personnel, it is difficult and/or time-consuming for a human to determine if the spoken address is correct. Currently, there exists an unmet need for a computer system to automatically extract a location of a calling device during a conversation via natural language processing and validate the extracted location to ensure the accuracy of the extracted location. Further, there exists an unmet need to generate targeted corrections to the location of the calling device to account for human error when a caller is not certain of their location. A system with increased location accuracy via geovalidation improves computer functionality by providing a more accurate result than existing systems are capable of.

The systems and methods of the present invention are operable to improve computer technology by increasing the accuracy of extracted locations from a conversation via an artificial intelligence engine operable to filter emergency and nonemergency calls, extract a location via natural language processing, generate targeted address corrections, and validate the extracted location.

The systems and methods of the present invention include a platform including at least one computer processor and a memory, wherein the platform includes an artificial intelligence engine including natural language processing and large language model (LLM) capabilities operable to extract location information from a conversation transcript, format the extracted location information into a unique data schema based on a type of location, cross-reference and compare the location information in the unique data schema against a database of locations, generate targeted address corrections, and validate the location information based on the cross-referenced and compared location information.

The platform is operable to receive a telephone call from a user device. The user device includes cell phones, tablets, computers, landlines, and/or any other device capable of completing a telephone call. After receiving the telephone call, the platform begins extracting information to begin geovalidation.

FIG. 1A is a schematic diagram of a platform including an artificial intelligence engine screening a call according to one embodiment of the present invention. The platform is operable to receive a telephone call from a user device and engage the caller via the artificial intelligence engine. Upon answering the call, the artificial intelligence engine immediately queries the user if the call is an emergency. In one embodiment, the query is audible (i.e., "Is this an emergency?"). In one embodiment, the artificial intelligence engine is operable to execute the audible query in any language. In another embodiment, the query requests a keypad input from the user (i.e., press 1 for emergency or 2 for non-emergency). The artificial intelligence engine receives a response from the user and is operable to utilize natural language processing to determine if the call is an emergency or a non-emergency. If the response from the user received by the platform indicates the call is an emergency, then the artificial intelligence engine routes the call to an emergency hotline. If the response from the user received by the platform indicates the call is not an emergency, the artificial intelligence engine continues a conversation with the user and begins a transcript of any input received by the platform from the user.

After the transcript begins, the artificial intelligence engine prompts the user to explain why the user is calling. Using natural language processing via analyzing the transcript, the artificial intelligence engine analyzes the information received from the user. The artificial intelligence engine is equipped with an LLM to generate a response and converse with the user. The natural language processing of the transcript is used as input for geovalidation.

Figure 1B:
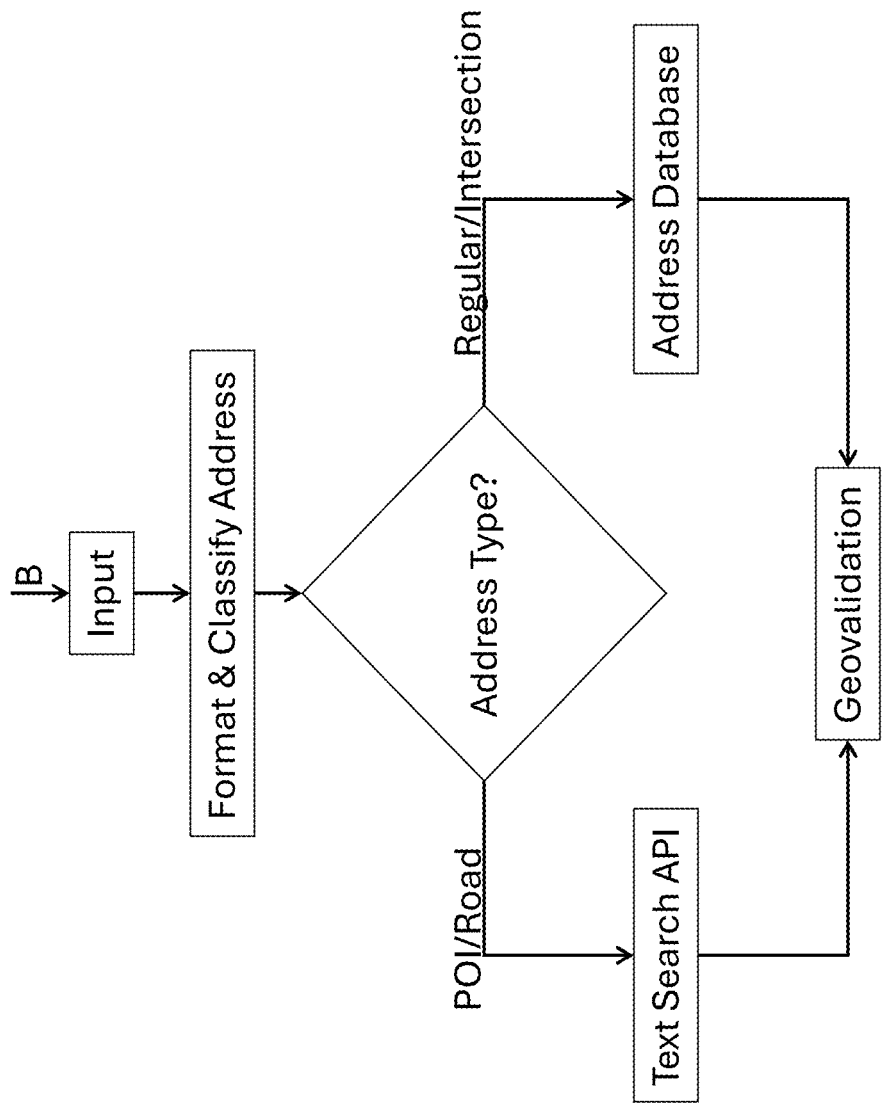
FIG. 1B is a schematic diagram of a platform including an artificial intelligence engine operable to conduct an address comparison according to one embodiment of the present invention.

FIG. 1B is a schematic diagram of a platform including an artificial intelligence engine operable to conduct an address comparison according to one embodiment of the present invention. The artificial intelligence engine utilizing natural language processing of the transcript includes determining and/or extracting an address, location, point of interest, intersection, landmark, road, and/or any other geolocation data, which is used as the input for geovalidation. The artificial intelligence engine is operable to transform the input received by the platform via large language model capabilities to classify an address (i.e., determine an address type) and properly format the classified address, depicted further in FIG. 1C. In one embodiment, if the artificial intelligence engine determines that the address type is a point of interest (POI) or a road, the artificial intelligence engine uses a text search application programming interface (API) to communicate with a third-party database or search engine (i.e., Google) to verify the existence of the POI or the road. In one embodiment, the artificial intelligence engine is operable to analyze non-address-related contextual information to determine the address, location, point of interest, intersection, landmark, road, etc. For example, in one embodiment, the artificial intelligence engine is operable to use information extracted from a conversation, such as weather conditions, to help determine the address, location, point of interest, intersection, landmark, road, etc. To illustrate further, the artificial intelligence engine is operable to determine from the conversation that the address, location, point of interest, intersection, landmark, road, etc. is in a high-temperature environment at the time of the conversation and automatically rule out similar addresses where the temperature is currently cold.

Figure 1C:
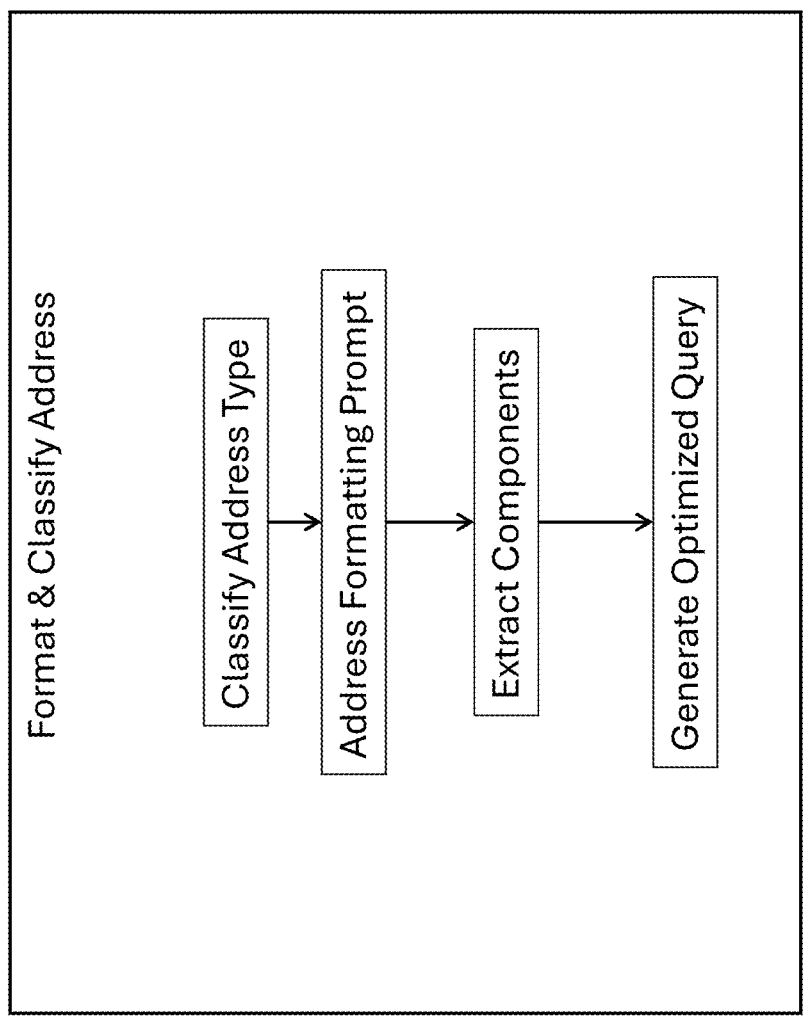
FIG. 1C is a schematic diagram of a platform including an artificial intelligence engine operable to format and classify an address according to one embodiment of the present invention.
Figure 1D:
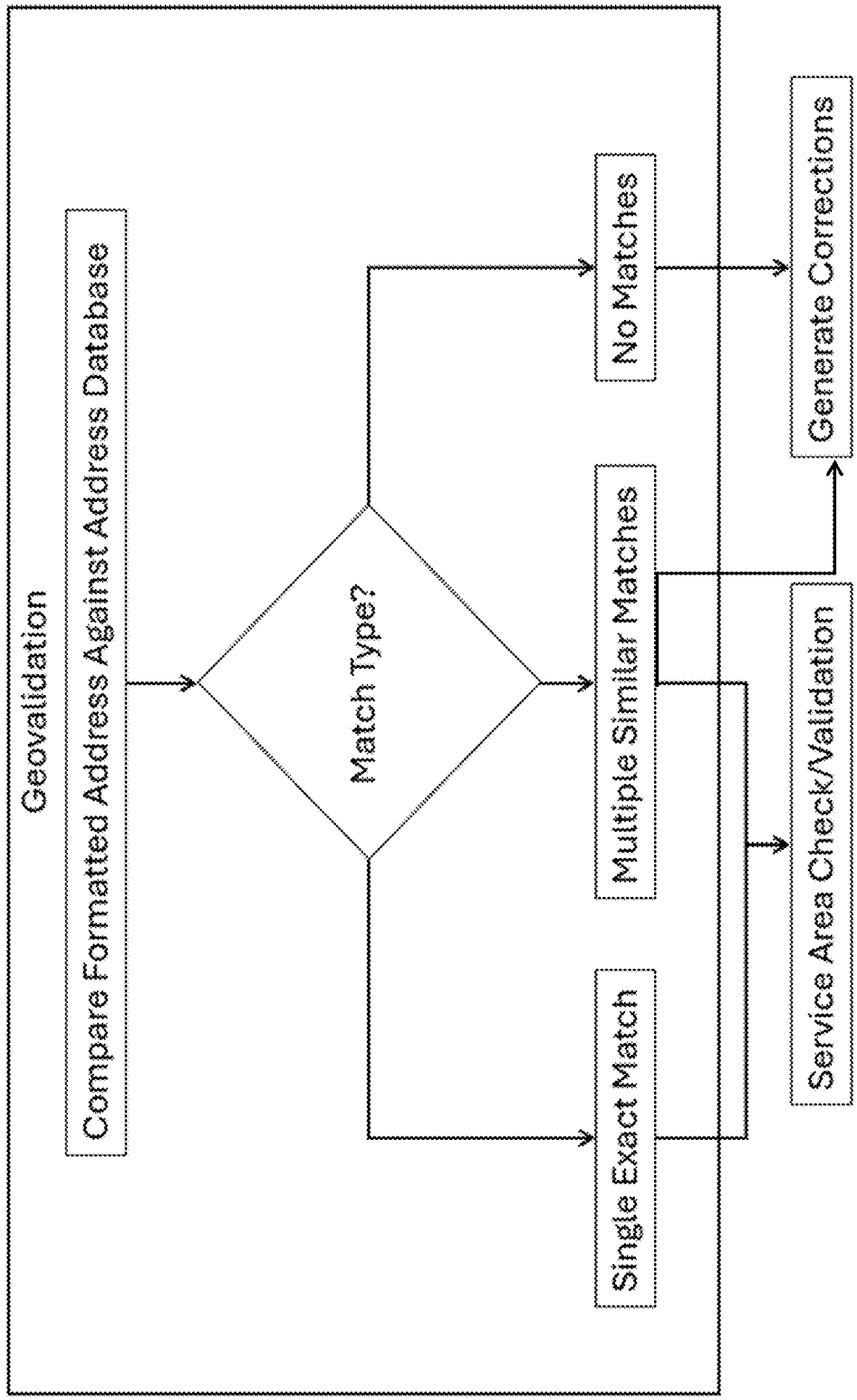
FIG. 1D is a schematic diagram of a platform including an artificial intelligence engine operable to geovalidate an address according to one embodiment of the present invention.

After the artificial intelligence engine verifies the existence of the POI or the road, the platform geovalidates the address, depicted further in FIG. 1D. If the artificial intelligence engine determines the address type is a regular address (i.e., street numbers associated with a street name, city, and/or zip code) or an intersection, the artificial intelligence engine is operable to compare the regular address or the intersection against a database of addresses. In one embodiment, the database of addresses is a third-party database such that the artificial intelligence engine is operable to utilize an API to conduct the comparison. In one embodiment, the database of addresses is on a local storage, a server, and/or a cloud environment such that the artificial intelligence engine does not utilize and API to conduct the comparison. In one embodiment, the artificial intelligence engine is operable to utilize an API to communicate with a third-party database operable to automatically determine missing address information. For example, in this embodiment, the artificial intelligence engine is operable to provide an address number and street name, and the third-party database is operable to automatically populate the city and zip code of the address. After the artificial intelligence engine compares the regular address or the intersection against the database of addresses, the platform geovalidates the address, depicted further in FIG. 1D.

FIG. 1C is a schematic diagram of a platform including an artificial intelligence engine that is operable to format and classify an address according to one embodiment of the present invention. The artificial intelligence engine receives the input and uses large language model capabilities to classify an address extracted from the input. In one embodiment, the artificial intelligence engine is equipped with large language model capabilities to classify the address. In one embodiment, the artificial intelligence engine is operable to call, via an API, a large language model to classify the address. In one embodiment, classifying the address includes the artificial intelligence engine making an initial classification that the address is a POI, road, regular, intersection, road, landmark, etc. Then, the artificial intelligence engine compares the classified address to a series of prompts to ensure proper address formatting. In one embodiment, each prompt represents a different address type (i.e., regular address, POI, intersection, road, landmark, etc.) via a custom data schema. In another embodiment, each prompt is able to include at least one similar element to another prompt for the different address types such that each prompt is not exclusively used for a single address type. In one embodiment, each prompt includes the custom data schema for the respective address type such that matching a prompt to the address includes address elements corresponding to fields in the custom data schema. For example, a prompt is able to include a custom data schema for a regular address, including fields in the custom data schema for a street number, street name, city, zip code, and country, such that the artificial intelligence engine is operable to compare extracted address elements from the input against fields in the custom data schema, including a street number, a street name, a city, a zip code, and a country (i.e., the input elements match the custom data schema). In one embodiment, each prompt is separate from the custom data schema such that the artificial intelligence engine compares the classified address to the series of prompts, and once the classified address is matched to a prompt, the custom data schema is added to the matched prompt to format the address. The artificial intelligence engine uses a weighted calculation to determine which prompt most closely matches the input.

The artificial intelligence engine is operable to utilize a plurality of learning techniques, including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The artificial intelligence engine is operable to use any of the aforementioned learning techniques alone or in combination.

Further, the artificial intelligence engine is operable to utilize predictive analytics techniques including, but not limited to, machine learning (ML), artificial intelligence (AI), neural networks (NNs) (e.g., long short-term memory (LSTM) neural networks), deep learning, historical data, and/or data mining to make future predictions and/or models. The artificial intelligence engine is preferably operable to recommend and/or perform actions based on historical data, external data sources, ML, AI, NNs, and/or other learning techniques. The artificial intelligence engine is operable to utilize predictive modeling and/or optimization algorithms, including, but not limited to, heuristic algorithms, particle swarm optimization, genetic algorithms, technical analysis descriptors, combinatorial algorithms, quantum optimization algorithms, iterative methods, deep learning techniques, and/or feature selection techniques to determine which prompt most closely matches the input.

After determining which prompt most closely matches the input, the artificial intelligence engine extracts components of the input to generate an optimized query via the artificial intelligence engine populating the corresponding custom data schema for the specific prompt. The artificial intelligence engine is further operable to assess the populated custom data schema and determine which, if any, information is missing. The artificial intelligence engine generates an optimized query back to the user requesting the missing information. In one embodiment, the artificial intelligence engine is operable to use natural language processing and LLM capabilities to formulate the query to a user device via a voice-rendered question over the telephone. The platform receives a response from the user, and the artificial intelligence engine updates the custom data schema accordingly. In one embodiment, the artificial intelligence engine is operable to determine if any necessary information is missing and iteratively generate a query until the necessary information is received for a particular key field of the custom data schema. In one embodiment, the artificial intelligence engine is operable to iteratively generate a query until the custom data schema is populated above a predefined threshold. In one embodiment, the predefined threshold is a required percentage of total fields populated for the custom data schema.

In one embodiment, the predefined threshold requires the percentage of total fields populated to be above 50%. In one embodiment, the predefined threshold requires the percentage of total fields populated to be above 75%. In one embodiment, the predefined threshold requires the percentage of total fields populated to be above 85%. In one embodiment, the artificial intelligence engine is operable to weigh certain fields of the custom data schema heavier than other fields of the custom data schema to achieve the predefined threshold. For example, the artificial intelligence engine is operable to weigh the name of a city heavier than the digits of a street address such that the name of the city, although populating one field of the custom data schema, is credited a larger percentage towards achieving the predefined threshold. Advantageously, iteratively generating the query increases the percentage of accurate geovalidated addresses relative to prior art computing technology.

FIG. 1D is a schematic diagram of a platform including an artificial intelligence engine operable to geovalidate an address according to one embodiment of the present invention. To conduct geovalidation, the artificial intelligence engine compares the populated custom data schema (i.e., a formatted address) against an address database. In one embodiment, the address database includes an API to a third-party database. In one embodiment, the artificial intelligence engine is operable to utilize a web crawler to scrape web data to populate the address database. In one embodiment, comparing the populated custom data schema to the address database includes the artificial intelligence engine querying a search engine using the populated custom data schema and comparing the populated custom data schema against the results produced by the search engine. In one embodiment, the artificial intelligence engine querying the search engine includes querying the search engine using non-address-related contextual information, such as weather conditions, such that the artificial intelligence engine is operable to receive real-time weather information for a plurality of addresses in the address database to run the comparison. In one embodiment, the artificial intelligence engine is operable to filter addresses in the address database outside of a service area where a call is known to originate from. For example, in one embodiment, the artificial intelligence engine is operable to filter addresses outside a 150-mile radius from a city the artificial intelligence engine determined the call originated from.

When comparing the populated custom data schema results against the address database, the artificial intelligence engine determines if the populated custom data schema is a single exact match, multiple similar matches, or no matches to any data in the address database. If the artificial intelligence engine determines that the comparison is a single exact match or multiple similar matches, the artificial intelligence engine conducts a service area check/validation, as depicted further in FIG. 1E. If the artificial intelligence engine determines multiple similar matches or no matches, the artificial intelligence engine generates corrections, as depicted in FIG. 1F.

Figure 1E:
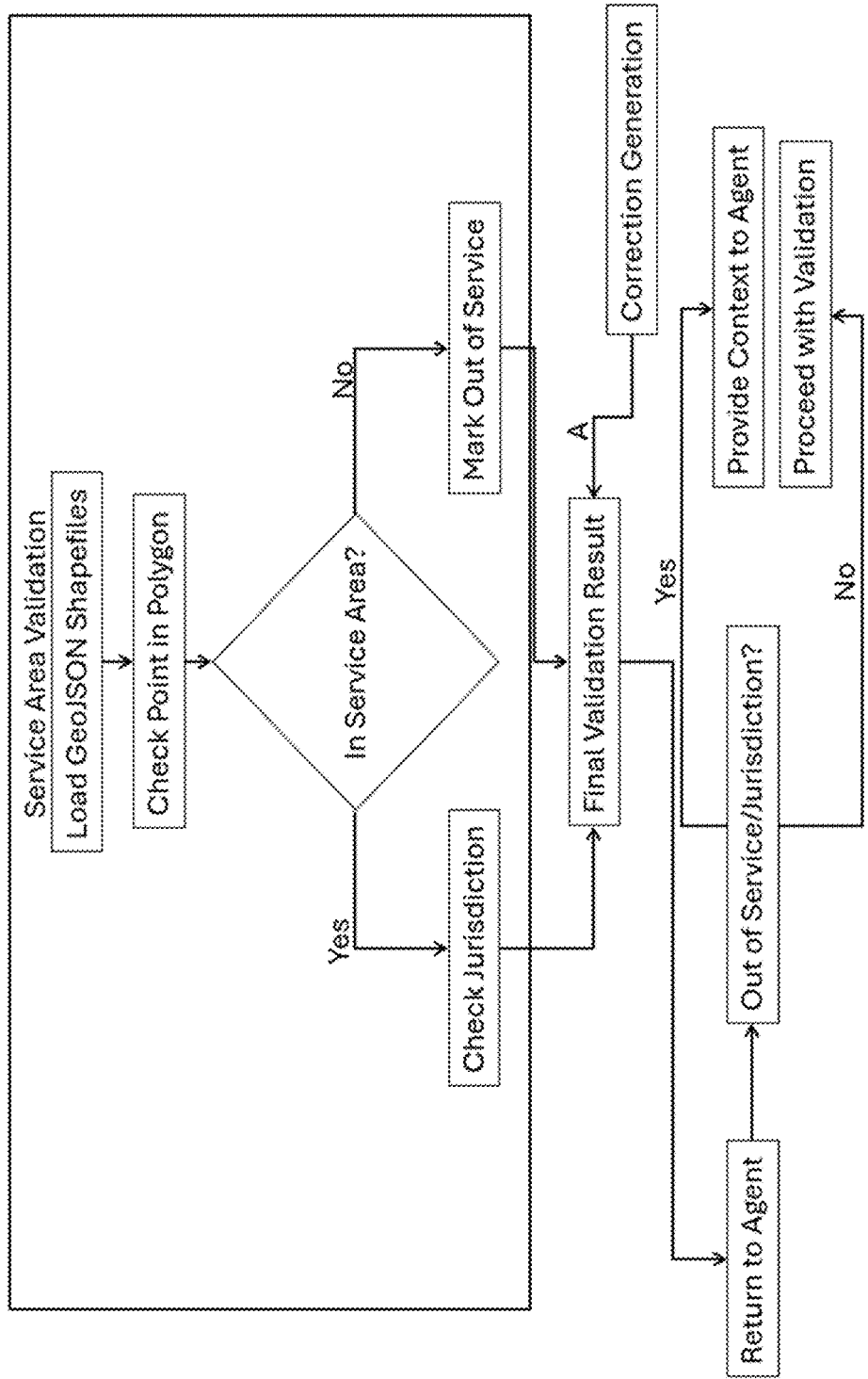
FIG. 1E is a schematic diagram of a platform including an artificial intelligence engine operable to conduct service area validation according to one embodiment of the present invention.

FIG. 1E is a schematic diagram of a platform including an artificial intelligence engine operable to conduct service area validation according to one embodiment of the present invention. The artificial intelligence engine loads Geo JavaScript Object Notation (i.e., GeoJSON) shapefiles for the populated custom data schemas, which represent geographical boundaries as closed shapes, including, but not limited to, longitudinal and latitudinal coordinates. The artificial intelligence engine verifies the GeoJSON shapefiles via polygon mapping. In one embodiment, polygon mapping includes geographic information system (GIS) visualization and analyzing geographic areas using the geographical boundaries. The artificial intelligence engine determines if the longitudinal and latitudinal coordinates are within a service area. In one embodiment, the service area includes the area in which a non-emergency call center is entitled to respond to the call received by the platform. If the artificial intelligence engine determines the longitudinal and latitudinal coordinates are within the service area, the artificial intelligence engine cross-references the longitudinal and latitudinal coordinates against geographic boundaries of a jurisdiction the non-emergency call center is authorized to operate within. If the artificial intelligence engine determines the longitudinal and latitudinal coordinates are outside the service area, the artificial intelligence engine marks the GeoJSON shapefile, and therefore marks the longitudinal and latitudinal coordinates, as out of service. The artificial intelligence engine then produces a final validation result after receiving correction generations, as depicted further in FIG. 1F. The artificial intelligence engine presents a geovalidated result to a call center agent and transfers the call to the call center. The artificial intelligence engine provides context to the call center if the geovalidated location is out of the call center jurisdiction or proceeds with validation if the geovalidated location is within the call center jurisdiction. In one embodiment, the context includes identifying the proper jurisdiction to handle the call and the proper call center within the proper jurisdiction that should handle the call. As such, the context provided to the call center enables the call center to reroute the call to the proper call center. Advantageously, the artificial intelligence engine geovalidating the longitudinal and latitudinal coordinates via GeoJSON shapefiles and automatically comparing the GeoJSON shapefiles against jurisdictional boundaries improves computer functionality by increasing the percentage of addresses that are properly validated and within the jurisdiction.

Figure 1F:
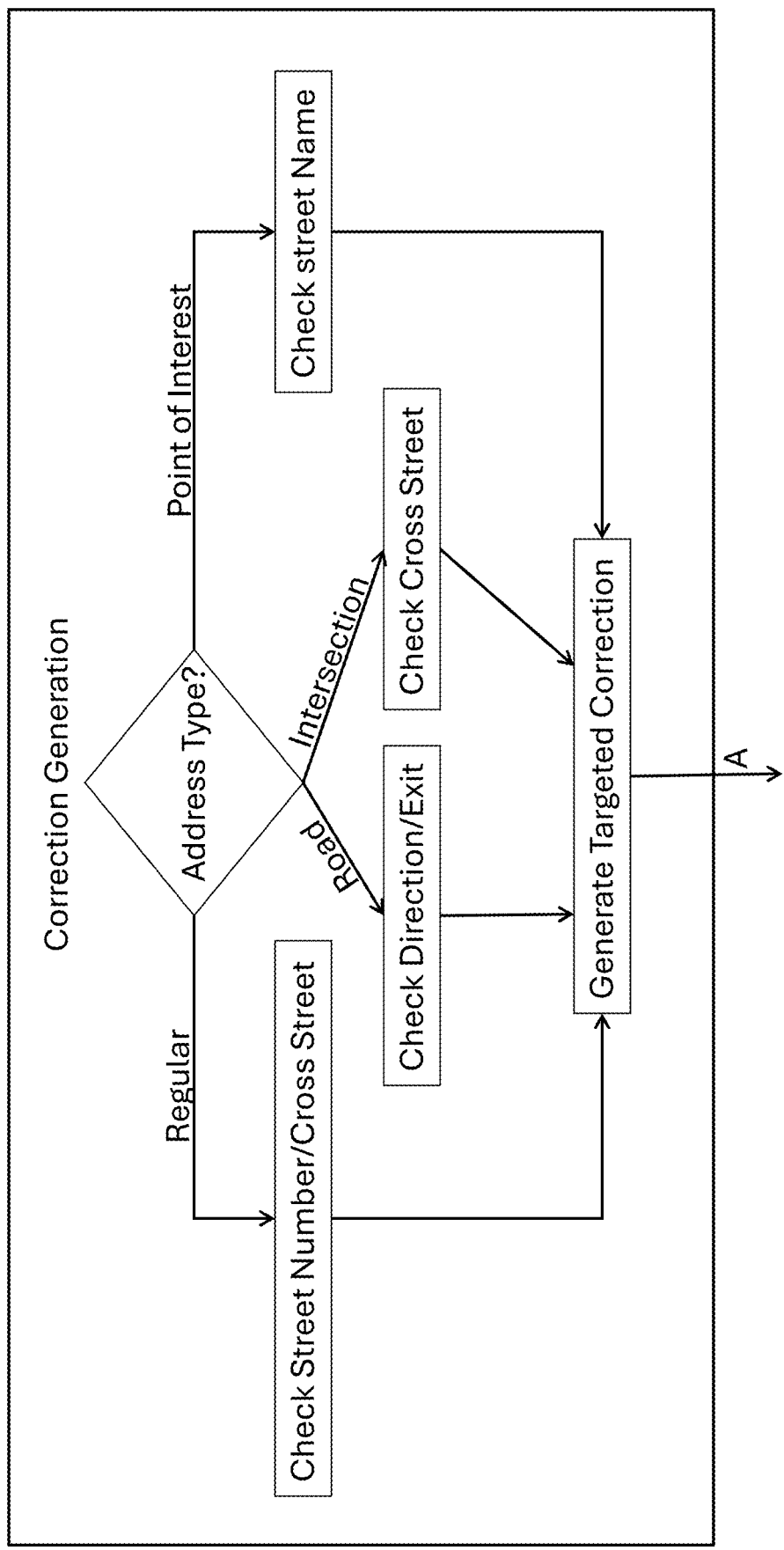
FIG. 1F is a schematic diagram of a platform including an artificial intelligence engine operable to generate corrections to an initial geolocation determination according to one embodiment of the present invention.

FIG. 1F is a schematic diagram of a platform including an artificial intelligence engine generating corrections according to one embodiment of the present invention. The artificial intelligence engine determines an address type after determining no matches between the populated custom data schema and the address database. The artificial intelligence engine re-analyzes the address type and determines if the address is a regular address, a road, an intersection, or a POI. The artificial intelligence engine cross-references each address type against a specific database, such as a database of street numbers and/or cross streets; cross-references a database of directions of the road and/or exits; cross-references a database of cross streets of intersections; and/or cross-references a database of street names for the POI. Based on the cross-referenced comparison, the artificial intelligence engine is operable to generate targeted corrections for the address type to ensure the address exists and is accurate. The targeted corrections ensure accuracy within the platform and accuracy of user-provided information. The targeted corrections are produced in a final validation result. Problematically, a user may provide inaccurate information, or an artificial intelligence system may inaccurately determine an address. However, advantageously, the platform of the present invention is operable to overcome the technological problems and generate targeted corrections to account for both user inaccuracies and/or artificial intelligence hallucinations or other inaccuracies.

The platform of the present invention is operable to validate an address and provide a non-emergency call operator with a confidence level that the address determined by the platform is accurate. In one embodiment, the platform is operable to validate an address with at least 75% accuracy. In one embodiment, the platform is operable to validate an address with at least 85% accuracy. In one embodiment, the platform is operable to validate an address with at least 95% accuracy, improving the functionality of computer technology. Importantly, the platform is operable to produce a geovalidated result that has been vetted and confirmed so that a non-emergency call operator is able to properly dispatch authorities and/or service providers to the correct location.

Figure 2:
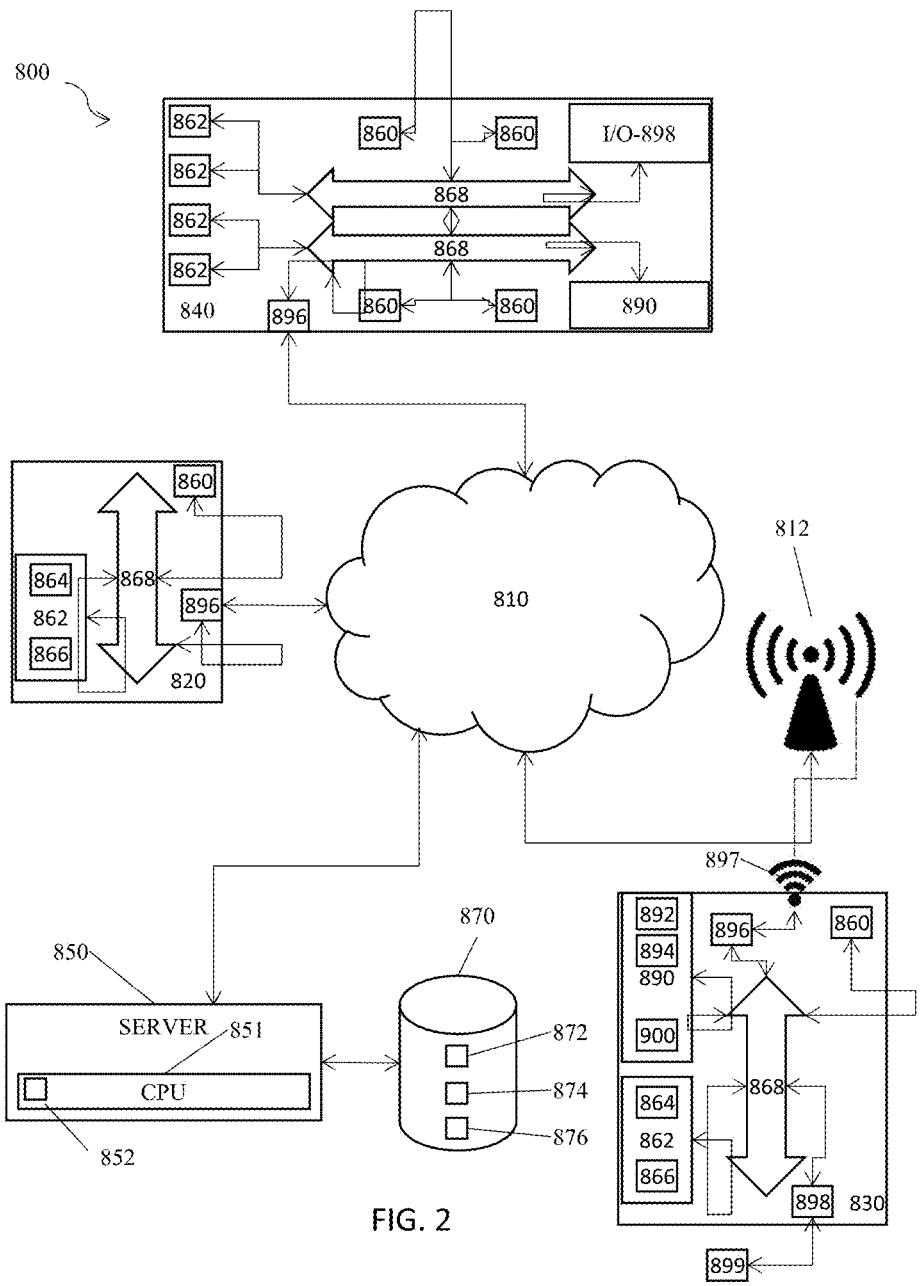
FIG. 2 is a schematic diagram according to one embodiment of the present invention.

FIG. 2 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 2, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

It is also contemplated that the computer system 800 is operable to not include all of the components shown in FIG. 2, is operable to include other components that are not explicitly shown in FIG. 2, or is operable to utilize an architecture completely different than that shown in FIG. 2. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable, and adaptable. The above-mentioned examples are just some of the many configurations that the mentioned components can take on. All modifications and improvements have been deleted herein for the sake of conciseness and readability but are properly within the scope of the present invention.

The invention claimed is:

1. A system for location validation, comprising:
a platform including a processor, a memory, and an artificial intelligence (AI) engine;
wherein the platform receives a telephone call from a user device;
wherein the AI engine is operable to extract an address from the telephone call via natural language processing and large language model capabilities;
wherein the AI engine is operable to populate a custom data schema based on the extracted address;
wherein the AI engine is operable to compare the populated custom data schema against at least one database;
wherein comparing the populated custom data schema against the at least one database includes the AI engine utilizing an application programming interface (API) call to access a third-party database;
wherein the AI engine is operable to generate targeted address corrections based in part on discrepancies in the comparison between the populated custom data schema and the at least one database; and
wherein the AI engine is operable to validate the extracted address when similarity of the comparison between the populated custom data schema and the at least one database exceeds a predefined threshold.

2. The system for location validation of claim 1, wherein the extracted address includes a regular address, a road, an intersection, or a point of interest.

3. The system for location validation of claim 1, wherein the AI engine is operable to determine if the validated extracted address is within a service area.

4. The system for location validation of claim 3, wherein determining if the validated extracted address is within the service area includes the AI engine loading Geo JavaScript Object Notation (GeoJSON) shapefiles and verifying the GeoJSON shapefiles.

5. The system for location validation of claim 1, wherein the AI engine is operable to determine if the comparison between the populated custom data schema and the at least one database is a single exact match, multiple similar matches, or no match.

6. The system for location validation of claim 1, wherein the user device includes a cell phone, a tablet, a computer, a landline device, and/or any other device capable of contacting a telephone hotline.

7. The system for location validation of claim 1, wherein the AI engine is operable to provide a confidence level that the validated extracted address is accurate.

8. The system for location validation of claim 1, wherein the AI engine is operable to iteratively generate a query as a request for more information to populate the custom data schema.

9. A method for location validation, comprising:
providing a platform including a computer processor, a memory, and an artificial intelligence (AI) engine;
receiving a telephone call from a user device by the platform;
extracting an address by the AI engine from the telephone call via natural language processing and large language model capabilities;
utilizing machine learning (ML) by the AI engine to populate a custom data schema based on the extracted address;
comparing by the AI engine the populated custom data schema against at least one database;
generating targeted address corrections by the AI engine based in part on the comparison between the populated custom data schema and the at least one database; and
validating by the AI engine the extracted address when the comparison between the populated custom data schema and the at least one database exceeds a predefined threshold;
wherein comparing the populated custom data schema against the at least one database includes the AI engine utilizing an application programming interface (API) call to access a third-party database.

10. The method for location validation of claim 9, further comprising generating by the AI engine a confidence level that the validated extracted address is accurate.

11. The method for location validation of claim 9, further comprising the AI engine determining if the validated extracted address is within a service area.

12. A system for location validation, comprising:
a platform including a processor, a memory, and an artificial intelligence (AI) engine;
wherein the platform receives a telephone call from a user device;
wherein the AI engine is operable to extract an address from the telephone call via natural language processing and large language model capabilities;

wherein the AI engine is operable to utilize machine learning (ML) to populate a custom data schema based on the extracted address;
wherein the AI engine is operable to compare the populated custom data schema against at least one database;
wherein comparing the populated custom data schema against the at least one database includes the AI engine utilizing an application programming interface (API) call to access a third-party database;
wherein the AI engine is operable to generate targeted address corrections based in part on the comparison between the populated custom data schema and the at least one database;
wherein the AI engine is operable to validate the extracted address when the comparison between the populated custom data schema and the at least one database exceeds a predefined threshold; and
wherein the AI engine is operable to provide a confidence level that the validated extracted address is accurate.

13. The system for location validation of claim 12, wherein the extracted address includes a regular address, a road, an intersection, or a point of interest.

14. The system for location validation of claim 12, wherein the AI engine is operable to determine if the validated extracted address is within a service area.

15. The system for location validation of claim 14, wherein determining if the validated extracted address is within the service area includes the AI engine loading Geo JavaScript Object Notation (GeoJSON) shapefiles and verifying the GeoJSON shapefiles.

16. The system for location validation of claim 12, wherein the user device includes a cell phone, a tablet, a computer, a landline device, and/or any other device capable of contacting a telephone hotline.

17. The system for location validation of claim 12, wherein the AI engine is operable to iteratively generate a query as a request for more information to populate the custom data schema.

\* \* \* \* \*